United States Patent [19]
Lüssi et al.

[11] Patent Number: 5,367,947
[45] Date of Patent: Nov. 29, 1994

[54] COFFEE MACHINE

[75] Inventors: André Lüssi; Hans Zurbuchen, both of Wabern; Jürg von Gunten, Grooshöchstetten, all of Switzerland

[73] Assignee: Sintra Holding AG, Switzerland

[21] Appl. No.: 74,872

[22] PCT Filed: Oct. 8, 1992

[86] PCT No.: PCT/CH92/00206
§ 371 Date: Jun. 10, 1993
§ 102(e) Date: Jun. 10, 1993

[87] PCT Pub. No.: WO93/07792
PCT Pub. Date: Apr. 29, 1993

[30] Foreign Application Priority Data
Oct. 17, 1991 [CH] Switzerland ............. 030406/91

[51] Int. Cl.⁵ .................. A47J 31/24; A47J 31/36
[52] U.S. Cl. ............................. 99/287; 99/289 R
[58] Field of Search ............ 99/279, 286, 287, 289 R, 99/289 T, 289 D, 289 P, 291, 295, 297, 300, 302 R, 302 P; 426/433

[56] References Cited
U.S. PATENT DOCUMENTS

| | | | |
|---|---|---|---|
| 4,457,216 | 7/1984 | Dremmel | 99/287 |
| 4,681,028 | 7/1987 | Schmed | 99/289 R |
| 4,715,270 | 12/1987 | Harada | 99/289 R |
| 4,796,521 | 1/1989 | Grossi | 99/287 |

FOREIGN PATENT DOCUMENTS

| | | |
|---|---|---|
| 0154206 | 9/1985 | European Pat. Off. . |
| 0299399 | 3/1989 | European Pat. Off. . |
| 0486435 | 5/1992 | European Pat. Off. . |
| 2312998 | 6/1976 | France . |
| 2945360 | 5/1980 | Germany . |

Primary Examiner—Robert W. Jenkins
Attorney, Agent, or Firm—Pearne, Gordon, McCoy & Granger

[57] ABSTRACT

A coffee machine is provided having a housing containing removable first and second modules. The first module includes removably connected first and second submodules. The first submodule includes a brewing device. The second submodule includes a motor, a driving axle, gears for coupling the driving axle to the motor, and a further housing enclosing the motor and gears such that the driving axle extends through the housing and establishes a functional connection with said brewing device. The operational ability of the first module, when removed from the housing, can be checked because the means for supplying driving energy to the motor remains connected to the motor. For cleaning, the first submodule can be removed from the second submodule once electrical and liquid lines have been disconnected. The second module includes a fresh water container, a coffee grounds container, a residual water container, and control and heating elements for supplying fresh water from the fresh water container to the brewing device. Thanks to this modular design, cleaning, servicing, repairing and checking tasks may be easily carried out.

10 Claims, 4 Drawing Sheets

COFFEE MACHINE

BACKGROUND OF THE INVENTION

1. Field of the Invention

The present invention relates to a coffee machine with a housing, control and heating elements to heat up and supply fresh water to a brewing device, which comprises a brewing cylinder and two pistons, the brewing cylinder being drivable with a motor via a drive spindle and moveable in relation to the pistons.

2. Description of the Related

To prepare coffee with automatic coffee machines the so-called pressure brewing process is often used today. With this process hot water is conveyed under pressure through coffee powder present in a brewing chamber. The present invention relates in particular to coffee machines working according to this pressure brewing process. Many of them are already well-known on the market. Depending upon area of application, for example in households or in restaurant businesses, these known coffee machines differ in their construction especially with respect to robustness, flexibility in the running of the process, ease in servicing, cleaning and maintenance.

It is of common knowledge that in all coffee machines working according to the pressure brewing process, parts which come into contact with coffee powder and/or with the prepared drink are subjected to a certain soiling and have to be cleaned periodically. The cleaning of such parts varies in expense and time intensity from machine type to machine type. Depending upon the construction of a machine, the design of individual parts is more or less complicated with respect to maintenance or repairs.

In the German unexamined and published patent application DE 29 45 360, an automatic coffee machine is disclosed which works according to the pressure brewing process in which maintenance is facilitated in that the important elements of the coffee machine are housed in a kind of drawer which can be pulled out of the latter. In the housing of the coffee machine itself only a water tank and an outlet to provide the electrical connection between housing and drawer remain as securely installed elements. It follows from the specification of the German published application in connection with the drawings that, among other things, electrical, electromechanical as well as purely mechanical parts are housed in the drawer or in the module. One can say that the drawer contains all important elements and components of the coffee machine. These elements and components will be more easily accessible, especially for maintenance and repairs, than other embodiments of these types of coffee machines. For the periodic cleaning of the coffee-carrying elements, however, the brewing device as a component, for example, has to be to be dismounted or removed from the drawer each time, in that first the electrical and hydraulic connecting lines are disconnected and afterwards the brewing device itself removed by unscrewing the attachment screws. Such a procedure is disadvantageous for a process which is to be carried out periodically. Furthermore in the drawer there is a high risk of electrification due to the common arrangement of parts carrying electrical current and parts coming into contact with water.

In the European patent specification EP 0 154 206, a device is disclosed for preparation of hot drinks, especially coffee, in which a subassembly holder, removable from the device, is foreseen comprising all the parts exposed to soiling from coffee powder or from the prepared drink. This facilitates handling when cleaning the device in that only the subassembly holder has to be taken from the device. Since all the other parts are mounted securely in the coffee machine, a decisive advantage for cleaning purposes can no doubt be achieved through the design chosen, but not for servicing and repairs, however. Design of the other parts may not be necessarily easy. A control of the function of the coffee machine is only possible with the subassembly holder integrated or installed.

SUMMARY OF THE INVENTION

The object of the present invention is to create a coffee machine which permits comfortable cleaning of the parts subjected to soiling from coffee powder and/or from the prepared drink, permits a simple control of the efficiency, and which is designed of favorable construction for replacing individual parts when carrying out maintenance and servicing for repairs.

This object is fulfilled with a coffee machine which is characterized in that at least a first module divisible into two submodules is provided, the first submodule comprising a brewing device and in the second submodule there being disposed at least a driving motor or electromotor and gears, and in that the first module is detachable from the coffee machine in such a way that in the detached state the brewing device can continue to be driven by the motor.

The coffee machine according to the invention has a modular construction. The first module detachable from the machine is constructed of two separable submodules. The first submodule comprises the brewing device with the parts subjected to soiling from coffee powder and/or from the prepared drink. In the second submodule the driving motor is housed with the gear in a housing essentially splashproof. A plug connection, which is disposed on the housing of the second submodule, is provided for conducting electricity to the driving motor, an electromotor. After detachment of the first module from the coffee machine, the functioning of the brewing device can be examined at any time for servicing and repair purposes. The two submodules can be separated from each other for cleaning of the soiled parts of the brewing device. The brewing device can then be rinsed under a stream of water without the danger arising thereby that electrical or electromechanical parts become wet.

It is particularly advantageous if the remaining parts of the coffee machine are combined into further, easily detachable modules.

BRIEF DESCRIPTION OF THE DRAWINGS

An embodiment of the invention is more closely described in the following description and drawings, wherein.

DETAILED DESCRIPTION OF THE PREFERRED EMBODIMENT

Figure 1:
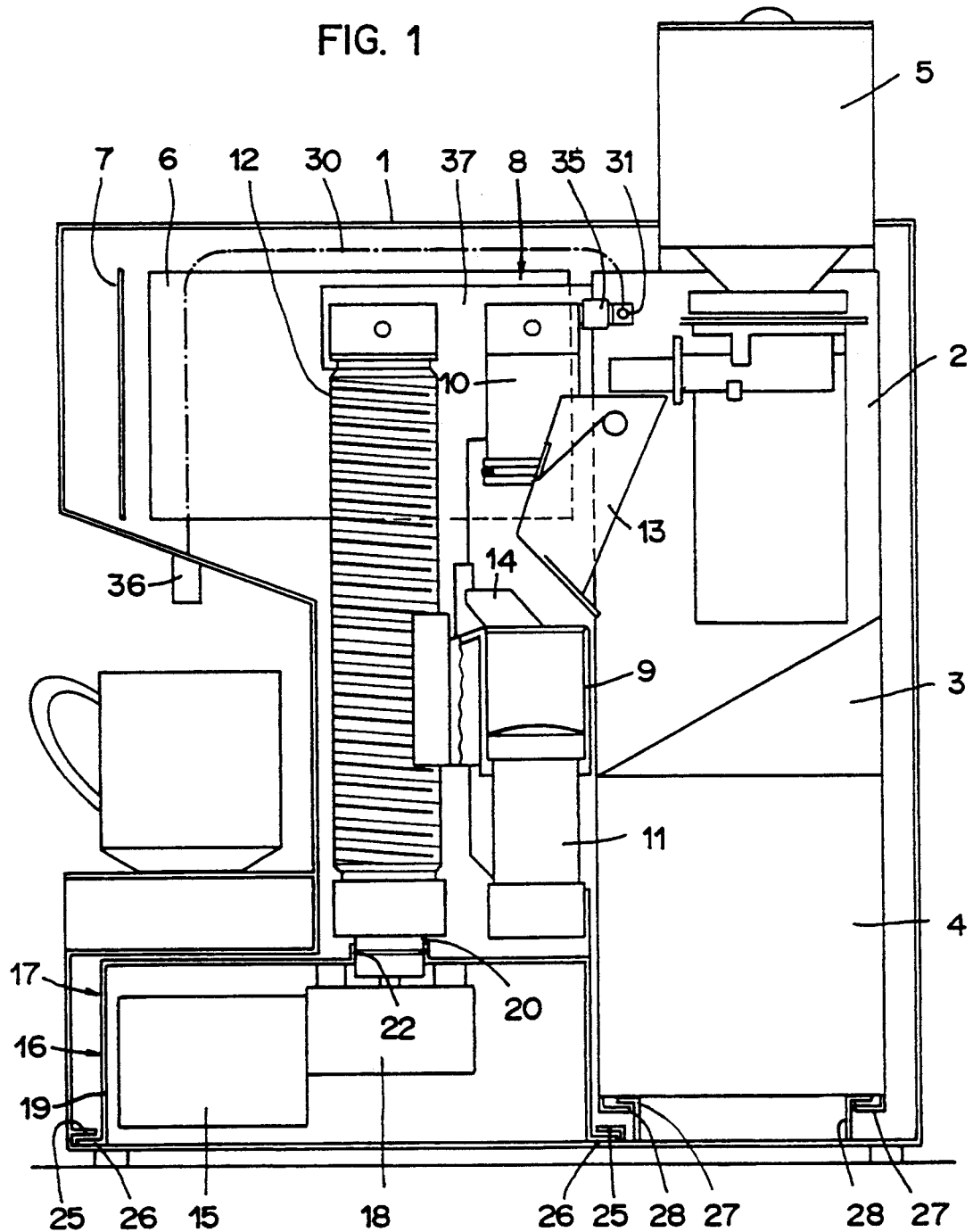
FIG. 1 is a profile of the coffee machine, the side part of the housing facing the viewer having been removed.
Figure 2:
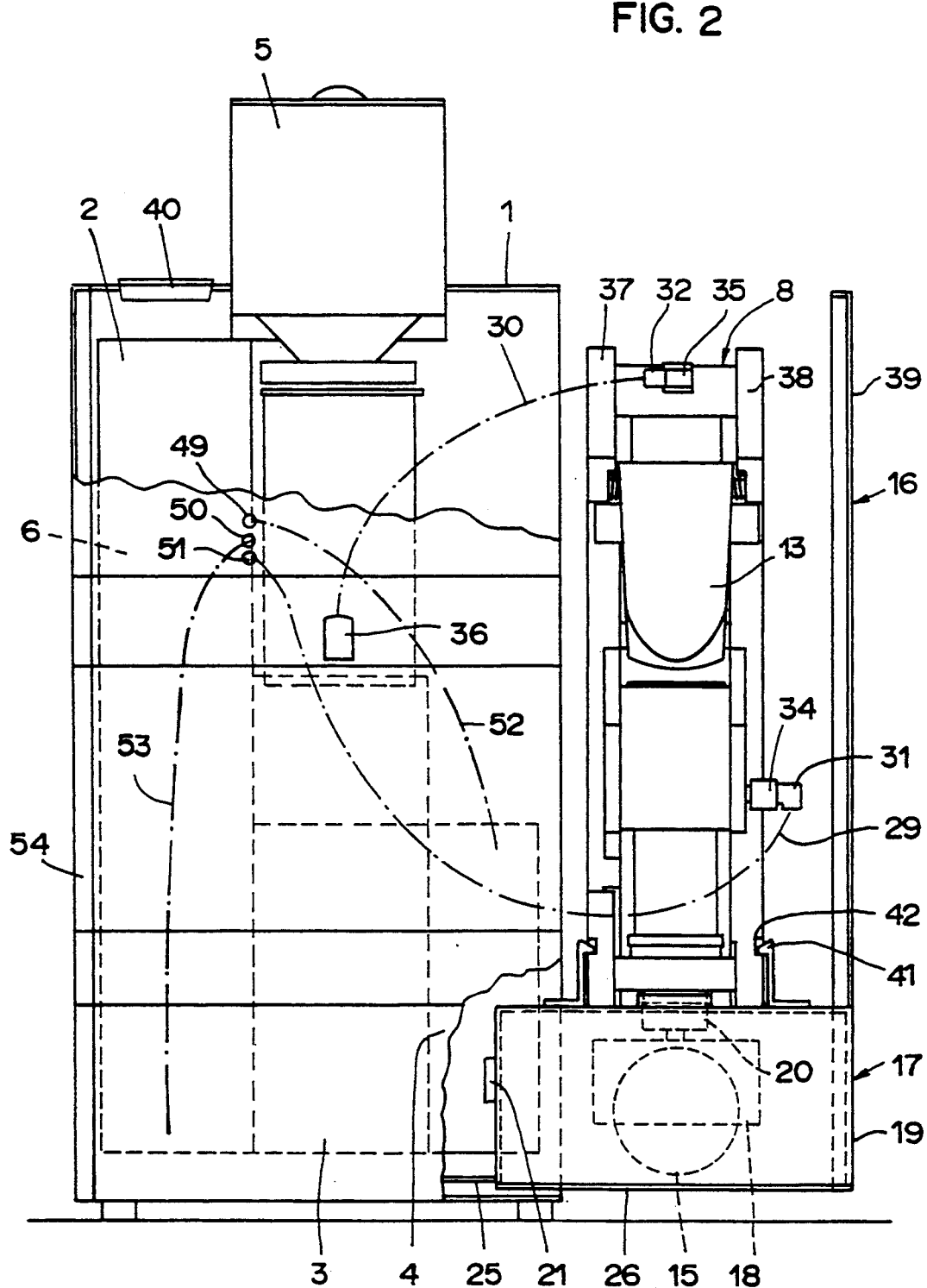
FIG. 2 is a front view of the machine with the first module pulled out.

The coffee machine shown in FIGS. 1 and 2 comprises a housing 1. Contained in this housing are a fresh water receptacle 2, a receptacle for coffee grounds 3 and a residual water receptacle 4. The first-mentioned receptacle can be filled and refilled through a fresh water feed opening 40, which is disposed on the top of the housing. A mill work 5, whose coffee bean container projects out of the housing, is also included. The machine has further control and heating elements, which are designated together under the reference symbol 6 in these figures. Detailed data on the individual elements is given further back. A control plate 7, preferably a printed card with electronic components inserted, is provided as the control unit for control of the coffee machine. A brewing unit or device 8 comprises a brewing cylinder 9, an upper or first piston 10, a lower or second piston 11 as well as drive spindle 12 rotatable around its longitudinal axis, the outer surface area of which is provided with a trapezoidal thread. The drive spindle 12 is positioned so that it can turn on both ends. The brewing cylinder 9 has a formation on its side facing the drive spindle 12 which meshes with the thread of the drive spindle. Through the turning of the latter the brewing cyclinder 9 moves, depending upon the direction of rotation, up in the direction of the upper piston 10 or down. In its upwards movement the brewing cylinder 9 essentially drags along the lower piston 11. The position of the brewing device 8 presented in FIG. 1 is the so-called feed position. The coffee ground by the mill work 5 reaches the brewing cylinder 9 in powder form via a coffee feed device 13. Following the feed step, the brewing cylinder 9, driven by the drive spindle 12, is guided upwards over the upper piston 10, the brewing cylinder 9 forming a brewing chamber. Through a first liquid pipe 29 and a first connection nipple 34, hot water under pressure reaches the brewing chamber which has been formed. After the coffee powder has flowed through, the water leaves the brewing chamber via a second connection nipple 35, to which a second liquid pipe 30 is connected. The end of said liquid pipe facing away from the second connection nipple 35 empties into a drink dispensing nozzle 36, through which the freshly brewed coffee flows into a cup placed below it. At the end of the brewing process, the brewing cylinder 9 is moved downwards in the opposite direction through rotation of the drive spindle 12, the lower piston 11 gradually reaching the vicinity of the upper edge of the brewing cylinder 9 by means of friction elements which are not portrayed in the figures. The leached coffee powder lies on the surface of the lower piston 11, and can be pulled off by a discharge device 14 and conveyed into the receptacle for coffee grounds. Through partial upward movement of the brewing cylinder 9, the feed position presented in FIG. 1 is reached again, the lower piston 11 being hindered from moving upward for the time being by the aforementioned friction elements which are not illustrated.

The aforementioned parts of the brewing device 8 are disposed between a first and a second side wall 37, 38. For the sake of clarity, the second side wall 38 has been omitted in FIG. 1. The brewing device 8 comprises all those parts which come into contact with the coffee powder and/or the prepared drink and are thereby subjected to soiling. All these parts are made preferably of plastic, and thus are not subjected to any corrosion.

The lower end of the drive spindle 12 extends over a drive axle 20, which projects out of a further housing 19 through an opening with a sealing means 22, for example an O-ring. Housed in the further housing 19 are a motor 15, preferably an electromotor, to which gears 18 are coupled. The aforementioned drive axle 20 extends from the gears through the said sealed opening into the area of the lower end of the drive spindle 12. Enclosed by the further housing 19, the electromotor 15 is protected against splashing water.

In the coffee machine according to the invention a first module is formed, which consists of a first submodule and a second submodule 17. The first submodule having the brewing device 8 and the second submodule having essentially the motor 15, the gears 18 with the axle 20 and the further housing 19 that encloses these components. A slide rail 26 extending away from the housing is disposed on each of two opposite sides of the further housing 19. Each of these slide rails grip in guide rails 25, which are formed on the housing 1 of the machine in such a way that it is possible for the first module 16 to be pulled out of the coffee machine. The pulled out position of this first module is shown in FIG. 2. A first housing side part 39 of the housing 1 can, for example, be fixed on the further housing 19 of the second submodule 17. In pulling the first module 16 out of the coffee machine, the side part 39 opens up the housing 1 and, at the same time, makes the parts remaining inside accessible. It is thereby self-evident that the first and the second liquid pipes 29, 30 are each designed in such a length that the pulling out of the first module 16 is not hindered. On the further housing 19 a plug connection 21 is foreseen through which the necessary driving energy is supplied to the motor 15 via electrical connections not portrayed in the figures. It is thereby possible for the brewing device 8 to be operated and its efficiency checked even when the first module is in a pulled out state. This is an important advantage for maintenance and repair, as already mentioned above.

It follows moreover from FIG. 2 that the first liquid pipe 29 reaches from said first connection nipple 34 to a connection 51, which is disposed in a further submodule 6, in which the control and heating elements are combined. A fresh water pipe 53 extends from the lower end of the fresh water receptacle 2 to a fresh water connection 50 of the further submodule 6. A residual water pipe 52 projects from a residual water connection 49 of the further submodule 6 into the residual water receptacle 4.

An especially advantageous construction of the coffee machine results in that the fresh water receptacle 2, the coffee grounds receptacle 3 and the residual water receptacle 4 are combined into a second module 33. Like the first module 16, the second module 33 can be pulled out of the coffee machine, and moreover, can be pulled out together with the second housing side part 54, on the side of the coffee machine facing away from the first housing side part. It is particularly advantageous if the further submodule 6 is a removable part of the second module 33.

Figure 3:
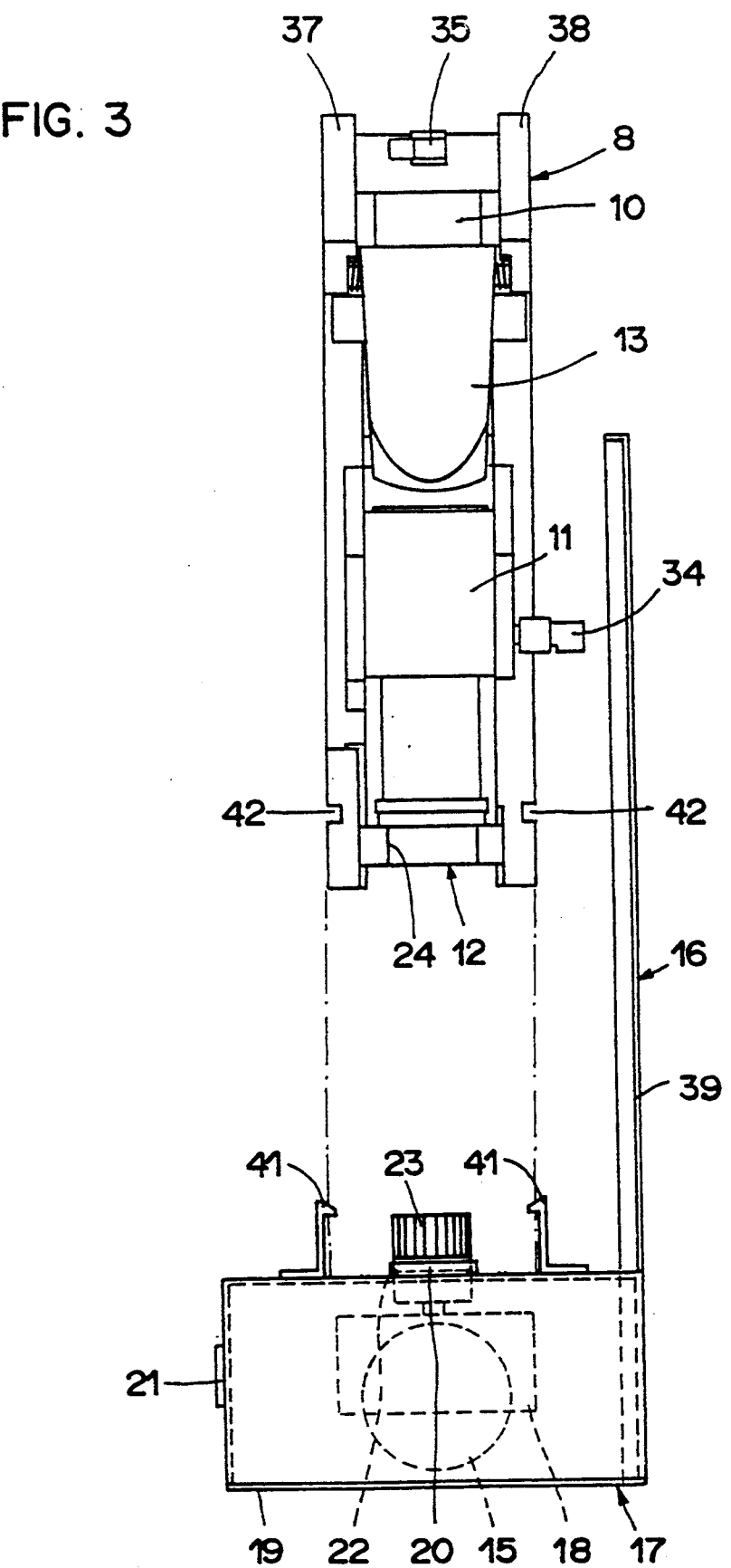
FIG. 3 is a front view of the first module removed from the coffee machine divided into two submodules.

The two liquid pipes 29, 30 are disposed attachably to, and detachably from, the first and second connection nipples 34, 35 of the brewing device 8 via first and second coupling means 31, 32, for example connecting clips. After severance of the liquid pipes 29, 30 from the brewing device 8 and the separation of the electrical line, not shown, from the plug connection 21, the first module 16 can be completely removed from the coffee machine, as shown in FIG. 3. The first submodule, essentially the brewing device 8, is held by spring clips 41 which are fixed to the further housing 19 of the second submodule 17, and which grip into correspondingly disposed grooves 42 in the two side walls 37, 38 of the brewing device 8. The brewing device 8 can be separated from the second submodule 17 through a sideways unfastening of the spring clips 41 out of the grooves 42. Thus it becomes visible that the end area of the drive axle 20 facing the drive spindle 12 is equipped with first drive means 23, for example an external toothed work, which drive means are meshed with second drive means 24 when the brewing device 8 is put on, for example an internal toothed work of the lower end area of the hollow-constructed drive spindle. Separated from the second submodule 17, the first submodule 8, which comprises, as already mentioned, all the parts subjected to soiling from coffee powder and/or coffee, can be rinsed off and cleaned easily under a stream of water in this way without the danger arising of some electrical component or other becoming wet. It is important to realize that no disassembly procedures, such as untightening of screws, are necessary as is the case with other machines. Every housewife will be able to carry out these periodically necessary cleaning steps.

In a similarly easy way the previously mentioned receptacles 2, 3, 4 can be cleaned by pulling out the second module 33. Should the further submodule 6 and the control plate 7 also be parts of the second module 33, it is recommended that these two parts be disposed in waterproof housings and that a possibility of separation be foreseen, for example by means of a catch or snap device.

Figure 4:
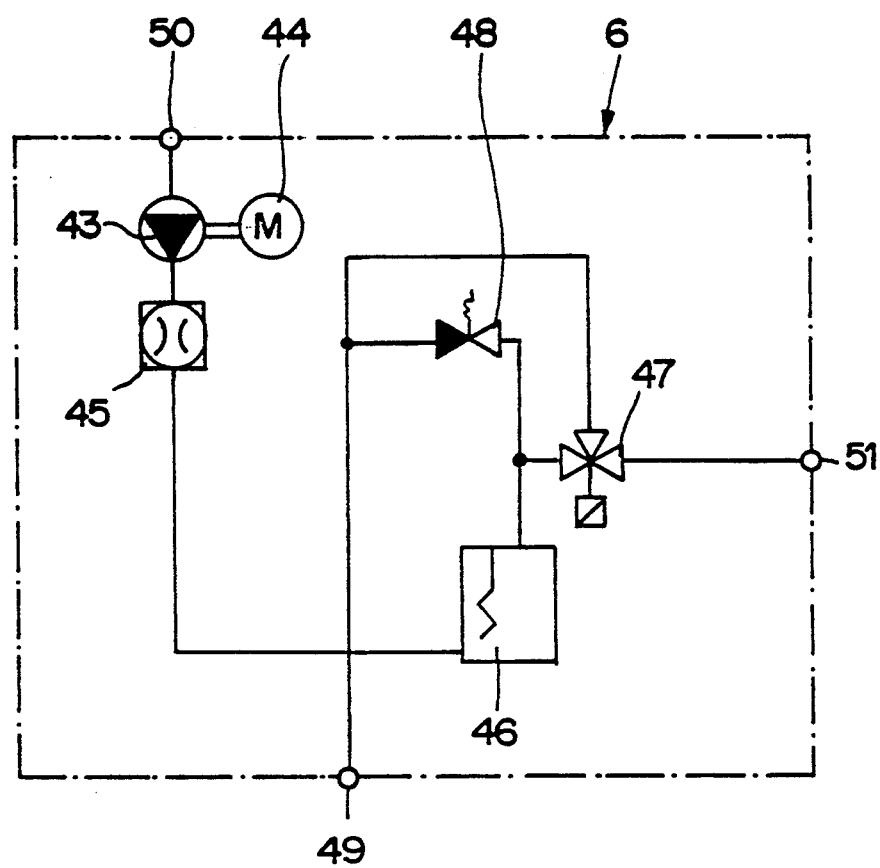
FIG. 4 is a schematic view of control and heating elements for the coffee machine according to the invention combined into a further module.

For the sake of completeness, the control and heating elements of the coffee machine have been symbolically portrayed, combined into a further submodule 6, in FIG. 4. Passing through a water apportioning element 45, fresh water from the fresh water supply 50 reaches the water heating element 46 by means of a fresh water pump 43, which is driven by a fresh water pump motor 44. The heated water leaves the heating element and reaches connection 51 for the first liquid pipe 29 through brewing valve 47. To avoid subsequent dripping of the drink dispensing nozzle 36, any remaining water can flow off into the residual water receptacle through connection 49 for the residual water pipe after closing of the electrically controlled brewing valve 47. When the pressure is too high, an overpressure valve 48 opens so that the hot water can reach the residual water receptacle directly.

What is claimed is:

1. Coffee machine comprising a housing (1), a brewing device having a brewing cylinder (9), two pistons (10, 11) closing said brewing cylinder to form a brewing chamber, and a driving spindle (12) upon which said brewing cylinder is operably connected and movable relative to the pistons, said coffee machine further comprising a motor to drive said driving spindle, gears coupling said motor to said driving spindle, a first module (16) having first and second submodules (8, 17) and means for removably connecting said first and second submodules, wherein said brewing device is disposed in said first submodule and said motor (15) and said gears (18) are disposed in said second submodule, and means for removably retaining said first module in said housing, wherein said brewing device (8) continues to be operable when said first module is removed from said housing.

2. Coffee machine according to claim 1 wherein said second submodule (17) has a further housing (19) which encloses and contains the motor (15) and the gears (18) to protect the motor and gears from splashing water, and an axle (20) connected to the gears and having an end portion projecting out of the further housing (19) for coupling said gears to said driving spindle.

3. Coffee machine according to claim 2, wherein said second module has sealing means (22) provided at a point of passage of the axle (20) through the further housing (19) of the second submodule (17).

4. Coffee machine according to claim 2, wherein said end portion of the axle (20), projecting out of the further housing (19) of the second submodule (17), is provided with first driving means (24), and said driving spindle is provided with second driving means (24) detachably engaged to said first driving means.

5. Coffee machine according to claim 2, wherein said means for removably retaining said first module in said housing Comprises guide rails (25) formed on the housing (1) and sliding rails (26) formed by the further housing (19) of the second submodule (17), wherein said sliding rails engage said guide rails to slidably retain said first module in such a way that the first module (16) can be pulled out of the housing.

6. Coffee machine according to claim 1, further comprising means for supplying driving energy disposed in said housing and connected to said motor, and wherein said second submodule (17) has a plug connection (21) for removably connecting said means for supplying driving energy to the motor.

7. Coffee machine according to claim 1, wherein said brewing device (8) has a coffee feed device for feeding coffee powder into said brewing cylinder, a discharge device for removing leached coffee powder, and two side walls between which the brewing device is disposed, said brewing device being subjected to soiling from the coffee powder and from prepared drink.

8. Coffee machine according to claim 1, further comprising liquid pipes (29, 30) for supplying water to said brewing device and removing prepared drink from said brewing device (8) and having coupling means (31, 32) provided on ends of said liquid pipes to detachably connect the liquid pipes (29, 30) to the brewing device (8).

9. Coffee machine according to claim 1, further comprising a fresh water receptacle connected to said brewing device for holding fresh water, a coffee grounds receptacle disposed in said housing for receiving leached coffee powder from said brewing device, a residual water receptacle connected to said brewing device for holding residual water, a second module (33), wherein said fresh water receptacle (2), said coffee grounds receptacle (3) and said residual water receptacle (4) are disposed in said second module, and means for removably retaining said second module in said housing.

10. Coffee machine according to claim 9, further comprising control and heating elements connected between said fresh water receptacle and said brewing device for heating said fresh water and supplying said fresh water to said brewing device, and wherein said second module (33) has a further submodule (6) in which said control and heating elements are disposed.

* * * * *